United States Patent
Van Fossan et al.

(10) Patent No.: US 9,169,748 B2
(45) Date of Patent: Oct. 27, 2015

(54) BYPASS SYSTEM FOR A TRANSMISSION

(71) Applicant: GM GLOBAL TECHNOLOGY OPERATIONS LLC, Detroit, MI (US)

(72) Inventors: Martin Phillip Van Fossan, Lake Orion, MI (US); Mark Olsen, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 180 days.

(21) Appl. No.: 13/712,160

(22) Filed: Dec. 12, 2012

(65) Prior Publication Data
US 2014/0158238 A1 Jun. 12, 2014

(51) Int. Cl.
*F16K 11/044* (2006.01)
*F01M 5/00* (2006.01)

(52) U.S. Cl.
CPC ............... *F01M 5/00* (2013.01); *F01M 5/007* (2013.01); *F16K 11/044* (2013.01); *Y10T 137/86895* (2015.04); *Y10T 137/87338* (2015.04)

(58) Field of Classification Search
CPC .. F16K 11/044; F01P 7/16; Y10T 137/87338; Y10T 137/87362
See application file for complete search history.

(56) References Cited

U.S. PATENT DOCUMENTS

| | | | | | |
|---|---|---|---|---|---|
| 3,913,831 | A | * | 10/1975 | Talak | 236/34.5 |
| 4,488,680 | A | * | 12/1984 | Itoh | 236/93 A |
| 4,537,346 | A | * | 8/1985 | Duprez | 236/34.5 |
| 6,719,208 | B2 | * | 4/2004 | Brown | 236/34.5 |
| 6,962,295 | B2 | * | 11/2005 | Ieda | 236/34.5 |
| 7,299,994 | B2 | * | 11/2007 | Brown et al. | 236/34.5 |

* cited by examiner

*Primary Examiner* — John Fox
(74) *Attorney, Agent, or Firm* — Quinn Law Group, PLLC

(57) ABSTRACT

A bypass system for a transmission is disclosed. A transmission casing defines a first aperture and a second aperture. A valve assembly includes a housing defining a first port and a second port. The housing defines an inlet in fluid communication with the first port for guiding a fluid into the transmission casing and an outlet in fluid communication with the second port for guiding the fluid out of the transmission casing. The valve assembly further includes an actuation device disposed in the housing. The housing is mounted to the transmission casing such that the first port and the first aperture cooperate with each other for routing the fluid into the transmission casing directly from the valve assembly, and the second port and the second aperture cooperate with each other for routing the fluid out of the transmission casing directly into the valve assembly.

20 Claims, 6 Drawing Sheets

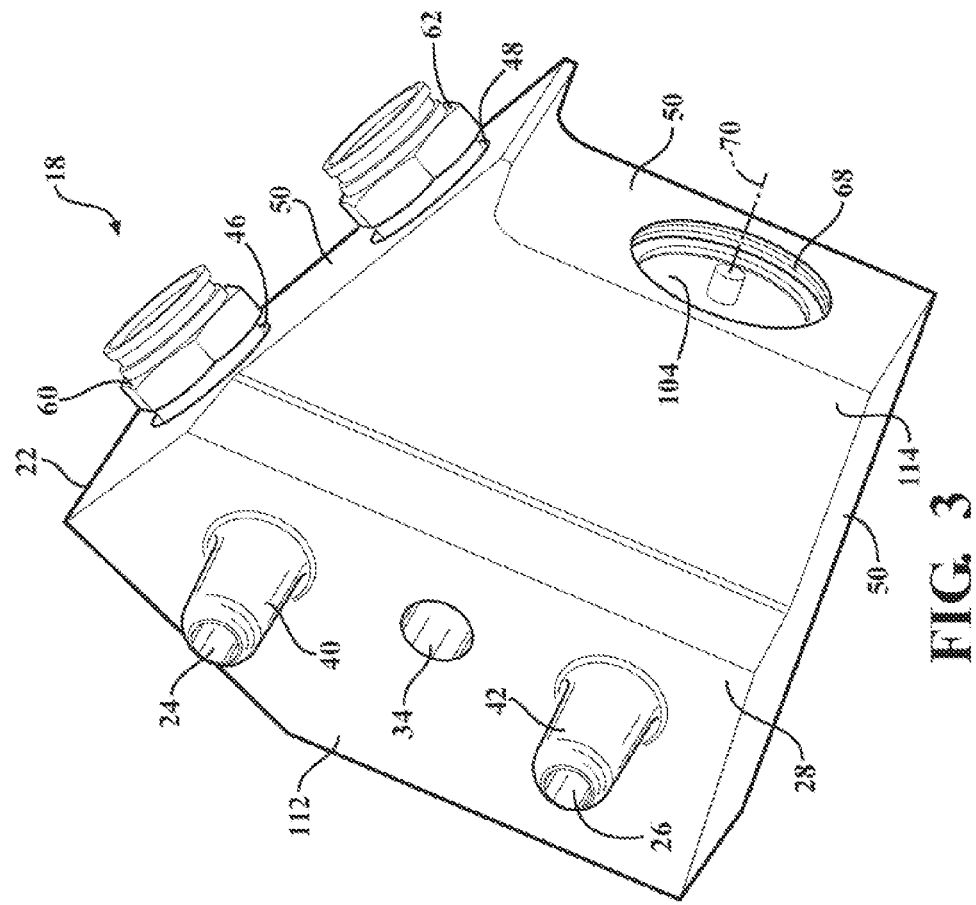
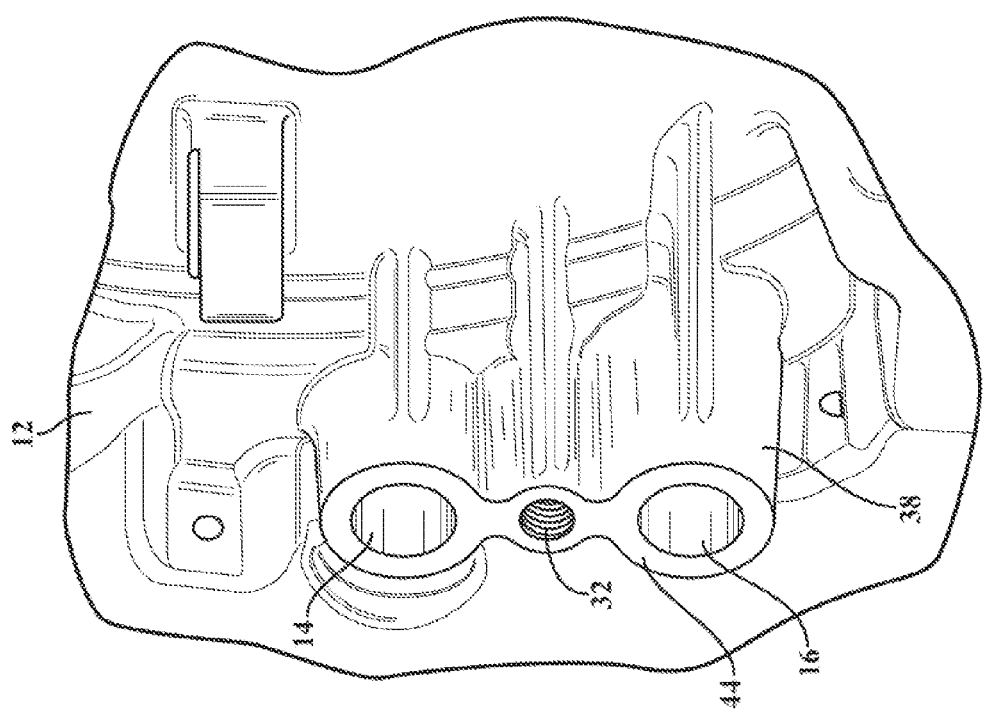
FIG. 3
FIG. 2

BYPASS SYSTEM FOR A TRANSMISSION

TECHNICAL FIELD

The present disclosure relates to a bypass system for a transmission.

BACKGROUND

Various vehicles have transmissions that have fluids transferred into and out of a transmission housing. A thermal bypass valve has been developed to transfer hot fluid out of the transmission housing and cold fluid back into the transmission housing. A first pair of lines are attached to the transmission housing and attached to the thermal bypass valve such that the fluid travels a distance through the lines between the valve and the transmission housing. The distance the fluid travels through the lines between the transmission housing and the thermal bypass valve can affect vehicle efficiencies.

Furthermore, a second pair of lines are attached to the thermal bypass valve; as such, the valve is disposed between the first and second pair of lines. A plurality of brackets and fasteners are utilized to support the four lines and the thermal bypass valve remote from the transmission housing.

SUMMARY

The present disclosure provides a bypass system for a transmission. The bypass system includes a transmission casing defining a first aperture and a second aperture spaced from the first aperture. The bypass system also includes a valve assembly. The valve assembly includes a housing defining a first port and a second port spaced from each other. The housing defines an inlet in fluid communication with the first port for guiding a fluid into the transmission casing and an outlet in fluid communication with the second port for guiding the fluid out of the transmission casing. The valve assembly further includes an actuation device disposed in the housing. The actuation device includes a member movable between a first position for routing the fluid from the second port into the inlet and back into the transmission casing with the outlet being bypassed and a second position for routing the fluid from the second port into the outlet and away from the transmission casing. The housing is mounted to the transmission casing such that the first port and the first aperture cooperate with each other for routing the fluid into the transmission casing directly from the valve assembly, and the second port and the second aperture cooperate with each other for routing the fluid out of the transmission casing directly into the valve assembly.

The present disclosure further provides a bypass system for a transmission. The bypass system includes a transmission casing. The transmission casing includes a mounting portion defining a first aperture and a second aperture spaced from each other. The bypass system also includes a valve assembly. The valve assembly includes a housing. The housing includes a first side facing the transmission casing. The housing defines a first port and a second port spaced from each other and each disposed through the first side. The housing defines an inlet in fluid communication with the first port for guiding a fluid into the transmission casing and an outlet in fluid communication with the second port for guiding the fluid out of the transmission casing. The housing also defines a cavity along a longitudinal axis, with the second port, the inlet and the outlet disposed transverse to the longitudinal axis and intersecting the cavity such that the second port, the inlet and the outlet are in fluid communication with the cavity. The valve assembly further includes a piston device disposed in the cavity of the housing. The piston device includes a piston movable between a first position for routing the fluid from the second port into the inlet and back into the transmission casing with the outlet being bypassed and a second position for routing the fluid from the second port into the outlet and away from the transmission casing. The housing is mounted to the mounting portion of the transmission casing such that the first port and the first aperture cooperate with each other for routing the fluid into the transmission casing directly from the valve assembly, and the second port and the second aperture cooperate with each other for routing the fluid out of the transmission casing directly into the valve assembly.

The detailed description and the drawings or Figures are supportive and descriptive of the disclosure, but the scope of the disclosure is defined solely by the claims. While some of the best modes and other embodiments for carrying out the claims have been described in detail, various alternative designs and embodiments exist for practicing the disclosure defined in the appended claims.

BRIEF DESCRIPTION OF THE DRAWINGS

FIG. 2 is a schematic perspective view of a mounting portion of a transmission casing.

FIG. 3 is a schematic perspective view of a valve assembly including a housing of a first configuration.

DETAILED DESCRIPTION

Figure 1:
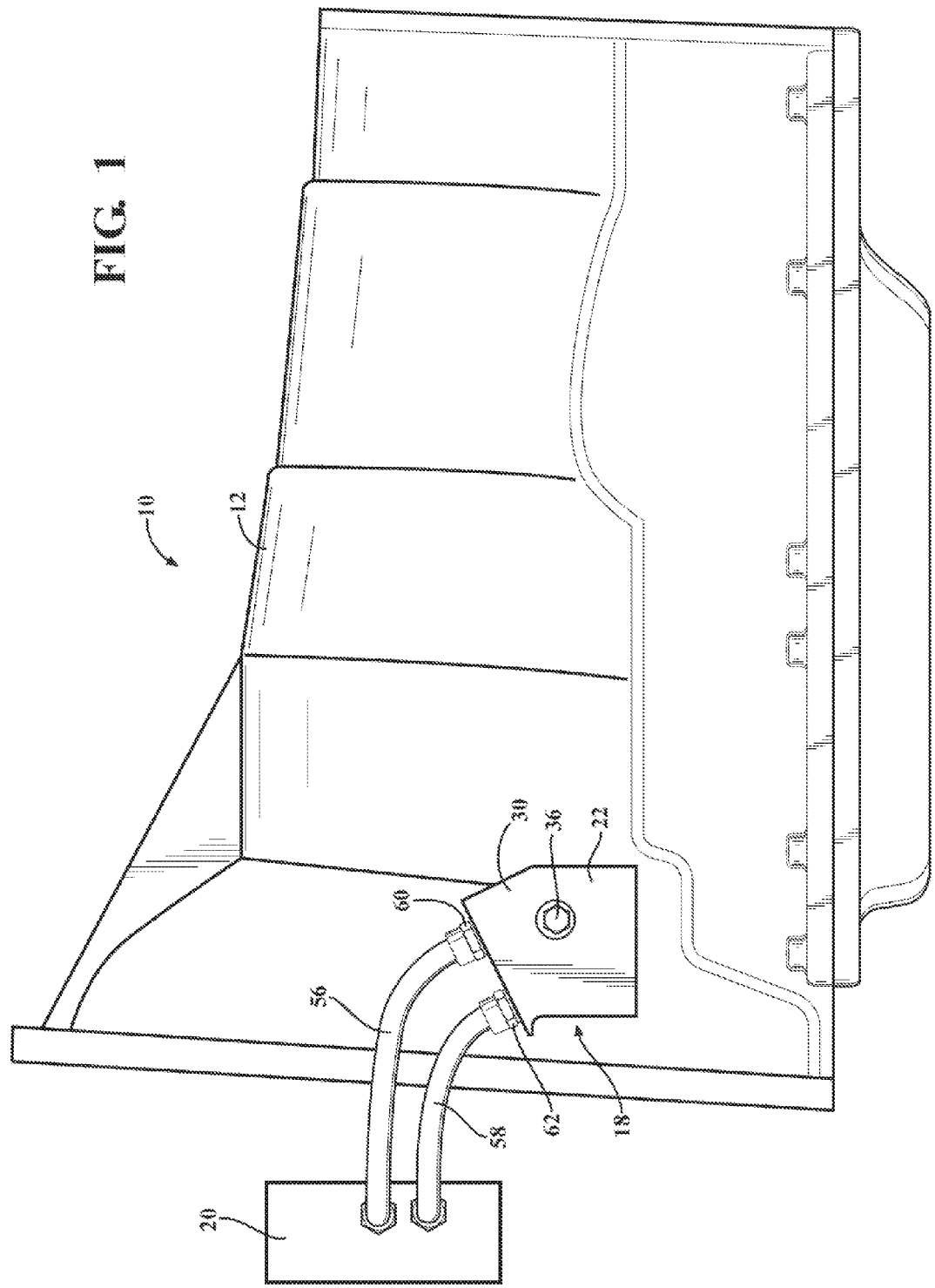
FIG. 1 is a schematic side view of a bypass system.

Referring to the Figures, wherein like numerals indicate like or corresponding parts throughout the several views, a bypass system 10 for a transmission is generally shown in FIG. 1. Generally, the bypass system 10 can be utilized in a vehicle having the transmission. It is to be appreciated that the bypass system 10 can be utilized in a hybrid vehicle or any suitable vehicle and can be utilized with a hybrid transmission or any suitable transmission.

Referring to FIGS. 1 and 2, the bypass system 10 includes a transmission casing 12 defining a first aperture 14 and a second aperture 16 spaced from the first aperture 14. Various components are disposed inside the transmission casing 12, such as, for example, one or more electric motors, a pump, one or more clutches, etc. The hybrid transmission can utilize one or more of the electric motors to drive the hybrid vehicle. Generally, the transmission includes the transmission casing 12.

Turning to FIGS. 1 and 3, the bypass system 10 further includes a valve assembly 18. Generally, the valve assembly 18 is mounted to the transmission casing 12. In other words, the valve assembly 18 is mounted directly to the transmission casing 12. As such, the valve assembly 18 directs, guides or routes a fluid into and out of the transmission casing 12 to lubricate and/or cool various components inside the transmission casing 12. For example, the fluid can be guided to one or more of the motors to lubricate and to cool the motors.

When the fluid in the transmission casing 12 is at a first temperature, the valve assembly 18 routes the fluid exiting the transmission casing 12 immediately back into the transmission casing 12. Furthermore, when the fluid in the transmission casing 12 is at a second temperature, the valve assembly 18 routes the fluid through the valve assembly 18 and away from the transmission casing 12 to a container 20 (see FIG. 1) before the fluid re-enters the transmission casing 12. In certain embodiments, the second temperature is greater than the first temperature. Therefore, the first temperature is generally cooler than the second temperature. As such, the first temperature of the fluid can occur when the vehicle has recently been started such that the fluid in the transmission casing 12 is cool or cold. The second temperature of the fluid can occur when the vehicle has been running such that the fluid in the transmission casing 12 is warm or hot. The valve assembly 18 can be referred to as a thermostat which can determine whether the fluid should be routed directly back into the transmission casing 12 or should be routed through the container 20 before re-entering the transmission casing 12.

In certain embodiments, the first temperature of the fluid is less than 82° C. In other embodiments, the first temperature of the fluid is from about 50° C. to about 81° C. In yet other embodiments, the first temperature of the fluid is from about 68° C. to about 81° C. In one embodiment, the first temperature of the fluid is about 69° C. It is to be appreciated that the first temperature of the fluid can be any suitable temperature as discussed further below.

Furthermore, in certain embodiments, the second temperature of the fluid is greater than 92° C. In other embodiments, the second temperature of the fluid is from about 93° C. to about 110° C. In yet other embodiments, the second temperature of the fluid is from about 93° C. to about 100° C. In yet other embodiments, the second temperature of the fluid is from about 93° C. to about 96° C. In one embodiment, the second temperature of the fluid is about 96° C. It is to be appreciated that the second temperature of the fluid can be any suitable temperature as discussed further below.

In one embodiment, the fluid is oil. Therefore, oil is guided into and out of the transmission casing 12 for lubricating and/or cooling various components inside the transmission casing 12. It is to be appreciated that the fluid can be any suitable fluid.

Referring to FIGS. 1 and 3, the valve assembly 18 includes a housing 22 defining a first port 24 and a second port 26 spaced from each other. Furthermore, the housing 22 of the valve assembly 18 can include a first side 28 facing the transmission casing 12 and a second side 30 opposing the first side 28. Therefore, the second side 30 faces away from the transmission casing 12. In certain embodiments, the first and second ports 24, 26 are each disposed through the first side 28 of the housing 22. In other words, the first side 28 of the housing 22 defines the first and second ports 24, 26. As such, the first and second ports 24, 26 extend into the housing 22 a length without intersecting the second side 30. In other words, the first and second ports 24, 26 do not extend through both the first and second sides 28, 30. It is to be appreciated that the first and second ports 24, 26 can be disposed through the second side 30 instead of the first side 28. It is to further be appreciated that the first and second ports 24, 26 can be defined by the housing 22 in any suitable location.

The housing 22 is mounted to the transmission casing 12 such that the first port 24 and the first aperture 14 cooperate with each other for routing the fluid into the transmission casing 12 directly from the valve assembly 18, and the second port 26 and the second aperture 16 cooperate with each other for routing the fluid out of the transmission casing 12 directly into the valve assembly 18. In other words, the housing 22 is mounted directly to the transmission casing 12, with the first port 24 and the first aperture 14 aligning with each other, and similarly, the second port 26 and the second aperture 16 aligning with each other.

In addition, the transmission casing 12 can define a bore 32 (see FIG. 2) and the housing 22 of the valve assembly 18 can define a hole 34, and generally, the hole 34 and the bore 32 cooperate with each other for mounting the valve assembly 18 to the transmission casing 12. In certain embodiments, the hole 34 and the bore 32 align with each other. A fastener 36 (see FIG. 1) is disposed in the hole 34 and the bore 32 to mount the valve assembly 18 to the transmission casing 12. Specifically, the fastener 36 is disposed in the hole 34 and the bore 32 to mount the housing 22 to the transmission casing 12.

In certain embodiments, the housing 22 of the valve assembly 18 defines the hole 34 through the first and second sides 28, 30. In other words, the hole 34 extends through the housing 22 and intersects both the first and second sides 28, 30. The fastener 36 is disposed in the hole 34 and the bore 32 to mount the valve assembly 18 to the transmission casing 12. Simply stated, the fastener 36 is disposed through the first and second sides 28, 30 and into the bore 32 of the transmission casing 12 to mount the housing 22 of the valve assembly 18 to the transmission casing 12. As such, the transmission casing 12 supports the valve assembly 18. Having the valve assembly 18 mounted to the transmission casing 12 simplifies assembly of the valve assembly 18 in the vehicle.

As best shown in FIG. 2, in certain embodiments, the transmission casing 12 can include a mounting portion 38 defining the first and second apertures 14, 16. As discussed above, the first and second apertures 14, 16 are spaced from each other. The housing 22 is mounted to the mounting portion 38 of the transmission casing 12 such that the first port 24 and the first aperture 14 cooperate with each other for routing the fluid into the transmission casing 12 directly from the valve assembly 18, and the second port 26 and the second aperture 16 cooperate with each other for routing the fluid out of the transmission casing 12 directly into the valve assembly 18. Generally, the housing 22 engages the mounting portion 38. In other words, the housing 22 is mounted to the transmission casing 12 such that the housing 22 engages the mounting portion 38. The mounting portion 38 can extend outwardly from the transmission casing 12 and can be any suitable configuration for cooperating with the valve assembly 18, and more specifically, cooperating with the housing 22.

The mounting portion 38 can define the bore 32, and as discussed above, the housing 22 of the valve assembly 18 can define the hole 34. As also discussed above, in certain embodiments, the hole 34 and the bore 32 align with each other. Therefore, the fastener 36 is disposed in the hole 34 of the housing 22 and the bore 32 of the mounting portion 38 to mount the valve assembly 18 to the transmission casing 12. Specifically, the fastener 36 mounts the housing 22 to the transmission casing 12. In other words, the fastener 36 secures the valve assembly 18 to the transmission casing 12. It is to be appreciated that the fastener 36 can be a bolt, a screw, a pin, a rod, a coupler, or any other suitable fastener. It is to also be appreciated that more than one fastener 36 can be utilized to mount the valve assembly 18 to the transmission casing 12.

Referring to FIG. 3, in certain embodiments, the housing 22 includes a first protrusion 40 and a second protrusion 42 each extending outwardly from the housing 22. More specifically, in one embodiment, the first and second protrusions 40, 42 each extend outwardly from the first side 28 of the housing 22. In other words, the first and second protrusions 40, 42 each extend outwardly away from the second side 30. Generally, the first protrusion 40 further defines the first port 24 and the second protrusion 42 further defines the second port 26. The first protrusion 40 of the valve assembly 18 mates with the first aperture 14 of the transmission casing 12 and the second protrusion 42 of the valve assembly 18 mates with the second aperture 16 of the transmission casing 12. More specifically, in certain embodiments, the first protrusion 40 can be disposed in the first aperture 14 of the mounting portion 38 and the second protrusion 42 can be disposed in the second aperture 16 of the mounting portion 38.

Any suitable seal, gasket, etc. can be disposed between the first and second protrusions 40, 42 and the first and second apertures 14, 16 respectively to minimize fluid therebetween. Furthermore any suitable seal, gasket, etc., can be disposed between the mounting portion 38 and the housing 22 adjacent to the first and second protrusions 40, 42 of the housing 22 to minimize fluid therebetween. For example, a gasket can be sandwiched between the mounting portion 38 and the housing 22 adjacent to the first and second protrusions 40, 42. More specifically, the gasket can be sandwiched between a face 44 (see FIG. 2) of the mounting portion 38 and one of the first and second sides 28, 30 of the housing 22.

Figure 4:
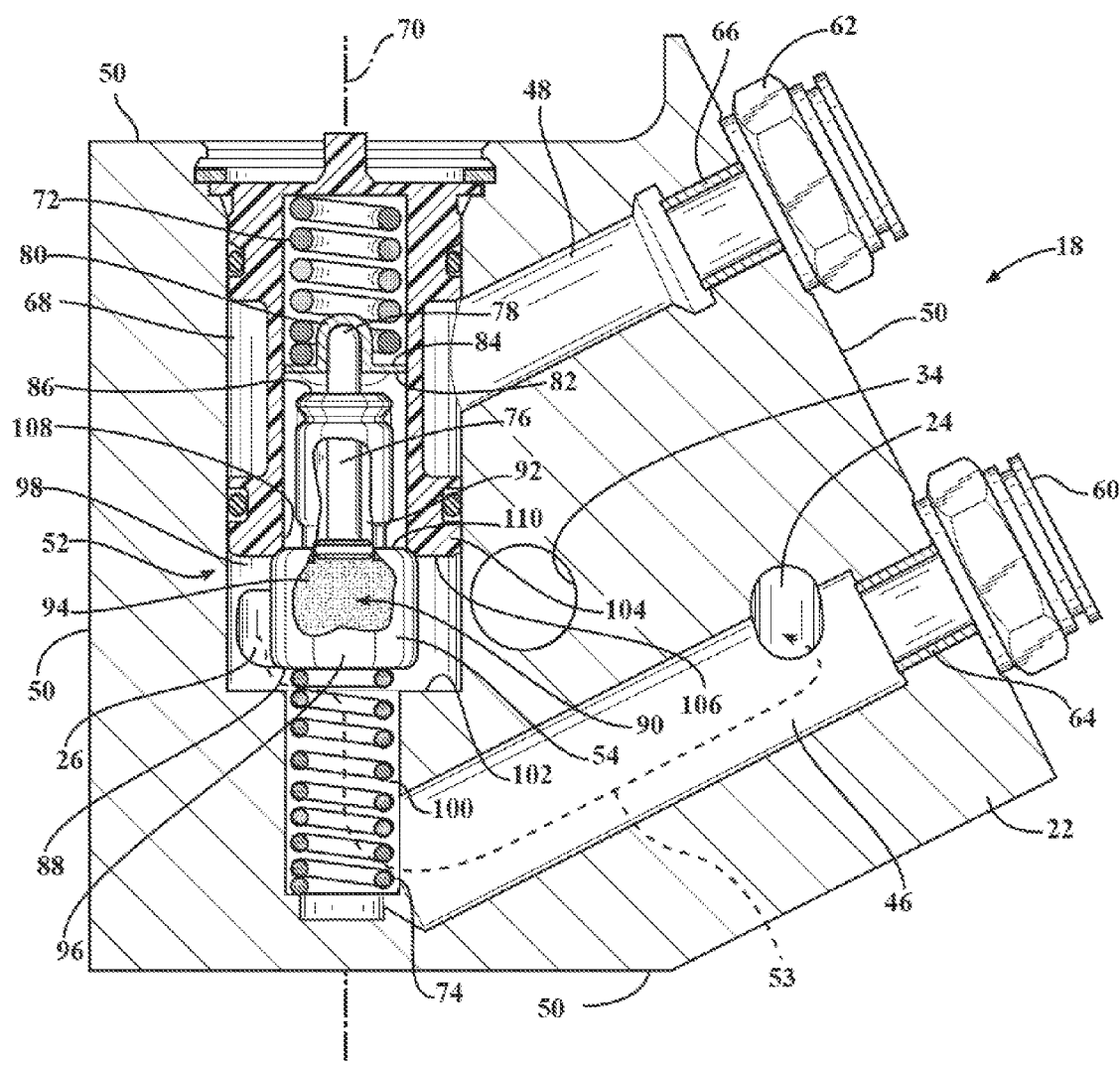
FIG. 4 is a schematic cross-sectional view of the valve assembly of FIG. 3 with a member, such as a piston, in a first position.
Figure 5:
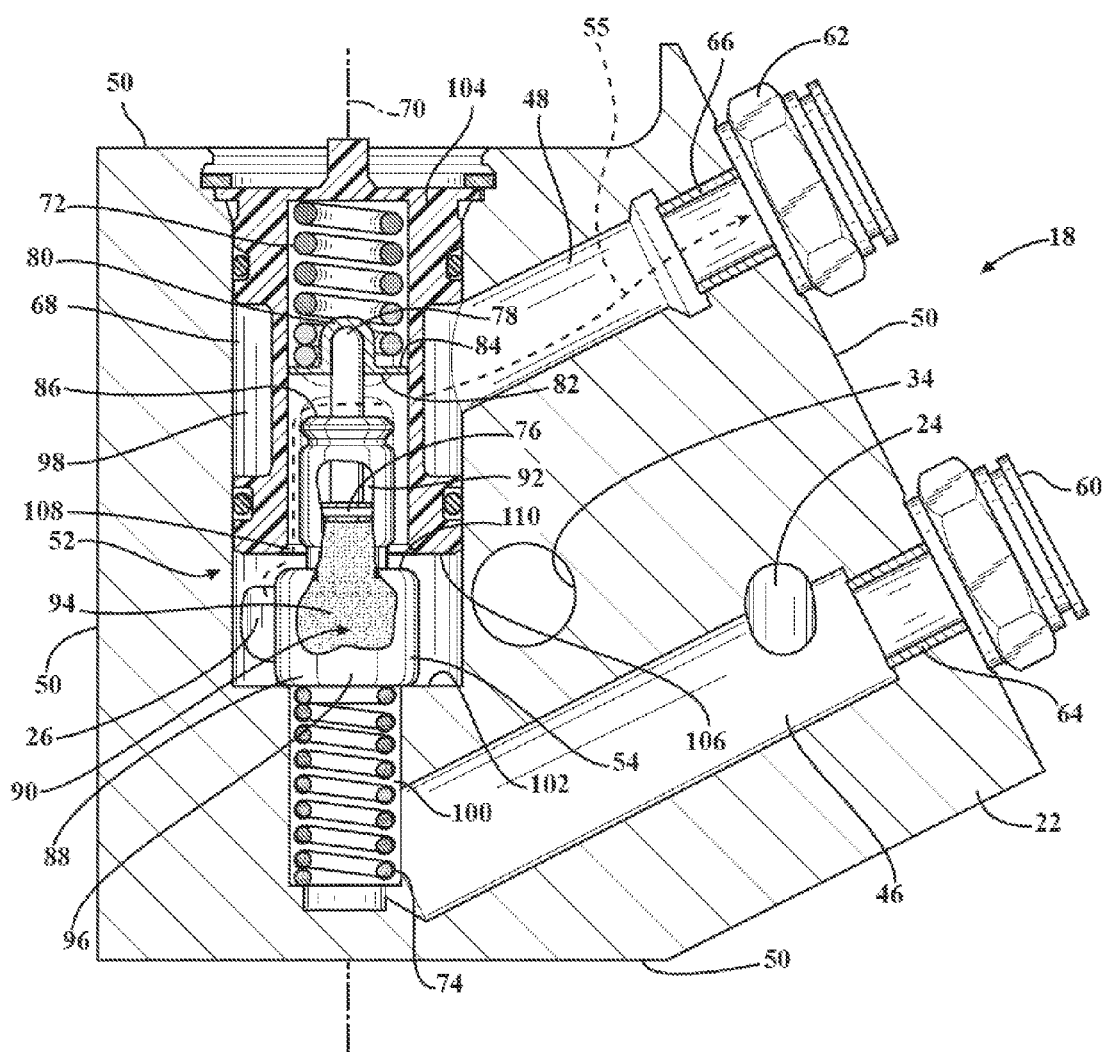
FIG. 5 is a schematic cross-sectional view of the valve assembly of FIG. 3 with the member, such as the piston, in a second position.

As best shown in FIGS. 4 and 5, the housing 22 defines an inlet 46 in fluid communication with the first port 24 for guiding the fluid into the transmission casing 12 and an outlet 48 in fluid communication with the second port 26 for guiding the fluid out of the transmission casing 12. Generally, the inlet 46 and the outlet 48 are spaced from each other. Generally, the first port 24 intersects the inlet 46. It is to be appreciated that the first port 24 can intersect the inlet 46 at any suitable location.

Turning to FIG. 3, the housing 22 of the valve assembly 18 can further include an outer periphery 50 between the first and second sides 28, 30. In certain embodiments, the inlet 46 and the outlet 48 can extend through the outer periphery 50. Therefore, the inlet 46 and the outlet 48 are spaced from the first and second sides 28, 30. It is to be appreciated that the inlet 46 and the outlet 48 can extend from any suitable location of the housing 22.

Continuing with FIGS. 4 and 5, the valve assembly 18 also includes an actuation device 52 disposed in the housing 22. Simply stated, the actuation device 52 is disposed inside the housing 22. Furthermore, the hole 34 of the housing 22 is spaced from the actuation device 52, and therefore, the fastener 36 for mounting the valve assembly 18 to the transmission casing 12 is spaced from the actuation device 52. Simply stated, the hole 34 through the housing 22 and the fastener 36 do not interfere with the actuation device 52.

The actuation device 52 includes a member 54 movable between a first position for routing the fluid from the second port 26 into the inlet 46 and back into the transmission casing 12 with the outlet 48 being bypassed and a second position for routing the fluid from the second port 26 into the outlet 48 and away from the transmission casing 12. Simply stated, when the member 54 is in the first position, the fluid is routed back into the transmission casing 12 directly from the valve assembly 18, and when the member 54 is in the second position, the fluid is routed out of the transmission casing 12 and to the container 20 which is discussed in detail below. The first position is shown in FIG. 4, as well as a first flow path 53 of the fluid. The second position is shown in FIG. 5, as well as a second flow path 55 of the fluid.

Turning to FIG. 1, the bypass system 10 can further include the container 20 briefly mentioned above. The container 20 receives the fluid when the member 54 is in the second position. Generally, the container 20 is configured to cool the fluid before directing, guiding or routing the fluid back to the transmission casing 12. Therefore, the container 20 can be defined as a cooling device to decrease the temperature of the fluid. As such, the fluid entering the container 20 has a higher temperature than the fluid exiting the container 20. For example, the fluid entering the container 20 can be at the second temperature and the fluid exiting the container 20 can be at the first temperature. Simply stated, warm or hot fluid enters the container 20 and the cooling device lowers the temperature of the fluid such that the fluid exiting the container 20 is cooler than the fluid that entered the container 20, and therefore, cooler fluid is routed or fed back through the valve assembly 18 and into the transmission casing 12. It is to be appreciated that the container 20 with the cooling device can be referred to as an auxiliary transmission oil cooler.

Continuing with FIG. 1, the bypass system 10 also includes a first tube 56 and a second tube 58 each coupled or attached to the valve assembly 18 and the container 20 for guiding the fluid directly between the valve assembly 18 and the container 20. Each of the first and second tubes 56, 58 are spaced from the mounting portion 38 of the transmission casing 12. In other words, the first and second tubes 56, 58 transfer the fluid directly between the valve assembly 18 and the container 20. For example, when the fluid exits the outlet 48 of the housing 22, the fluid then enters the second tube 58 and then enters the container 20. As another example, when the fluid exits the container 20, the fluid enters the first tube 56 and then enters the inlet 46 of the housing 22 and is routed through the first port 24 into the transmission casing 12.

Turning to FIGS. 3-5, the valve assembly 18 can include a first coupler 60 for attaching the first tube 56 to the valve assembly 18 and a second coupler 62 for attaching the second tube 58 to the valve assembly 18. Generally, the first coupler 60 is attached to the inlet 46 and the second coupler 62 is attached to the outlet 48. As shown in FIGS. 4 and 5, a stem 64 of the first coupler 60 is disposed inside the inlet 46 and a stem 66 of the second coupler 62 is disposed inside the outlet 48. It is to be appreciated that the first and second couplers 60, 62 can be attached to the inlet 46 and the outlet 48 respectively by any suitable methods. The first and second couplers 60, 62 can each be a quick connect coupler or any other suitable couplers.

In certain embodiments, as shown in FIGS. 4 and 5, the actuation device 52 can be further defined as a piston device 52 and the member 54 can be further defined as a piston 54. The housing 22 of the valve assembly 18 can also define a cavity 68 along a longitudinal axis 70. Generally, the piston 54 is moveable within the cavity 68 along the longitudinal axis 70. In other words, the piston 54 can move between the first and second positions in the cavity 68. Furthermore, the second port 26, the inlet 46 and the outlet 48 are in fluid communication with the cavity 68. More specifically, in certain embodiments, the second port 26, the inlet 46 and the outlet 48 are disposed transverse to the longitudinal axis 70 and intersect the cavity 68 such that the second port 26, the inlet 46 and the outlet 48 are in fluid communication with the cavity 68. In addition, the first port 24 is spaced from the cavity 68, the second port 26 and the outlet 48. Specifically, the first port 24 is disposed transverse to the longitudinal axis 70 and intersects the inlet 46 such that the first port 24 and the inlet 46 are in fluid communication. Therefore, the first port 24 is in fluid communication with the cavity 68 through the inlet 46. In other words, the first port 24 is in fluid communication with the cavity 68 indirectly.

The valve assembly 18 can further include a first biasing member 72 and a second biasing member 74 each disposed in the cavity 68 and engaging the piston device 52. Generally, the first and second biasing members 72, 74 cooperate to allow the piston 54 to move between the first and second positions. Specifically, the piston 54 is disposed between the first and second biasing members 72, 74. Furthermore, the second biasing member 74 engages the piston 54 to continuously bias the piston 54 to the first position. It is to be appreciated that the first and second biasing members 72, 74 can be springs, such as coil springs, or any other suitable biasing members.

As shown in FIGS. 4 and 5, the piston device 52 can include a plunger 76 disposed inside the piston 54, with the plunger 76 extending to a distal end 78 exposed outside of the piston 54. In other words, the distal end 78 extends outwardly from the piston 54. Generally, the first biasing member 72 is coupled the distal end 78 of the plunger 76 to continuously bias the plunger 76 toward the second biasing member 74.

Continuing with FIGS. 4 and 5, the valve assembly 18 can further include a seat 80 having a front side 82 and a rear side 84 opposing the front side 82. Generally, the distal end 78 of the plunger 76 engages the front side 82 of the seat 80 and the first biasing member 72 engages the rear side 84 of the seat 80. Therefore, the seat 80 is disposed between the first biasing member 72 and the piston 54. The seat 80 can assist in aligning or stabilizing the distal end 78 of the plunger 76, as well as allowing the first biasing member 72 to apply a force to the distal end 78. Specifically, the first biasing member 72 applies the force to the seat 80, which causes the seat 80 to apply the force to the distal end 78 to continuously bias the plunger 76 toward the second biasing member 74.

The piston 54 can include a first end 86 and a second end 88 spaced from each other along the longitudinal axis 70. As suggested above, the first biasing member 72 is disposed adjacent to the first end 86 and the second biasing member 74 is disposed adjacent to the second end 88. Specifically, the first biasing member 72 engages the rear side 84 of the seat 80 while the front side 82 of the seat 80 faces the first end 86 of the piston 54. Generally, the front side 82 of the seat 80 is spaced from the first end 86 of the piston 54. Furthermore, the second biasing member 74 engages the second end 88 of the piston 54.

Continuing with FIGS. 4 and 5, the piston 54 can define a chamber 90 and a channel 92 adjacent to the chamber 90 and in fluid communication with each other. The plunger 76 is disposed in at least one of the chamber 90 and the channel 92. In certain embodiments, the plunger 76 is generally disposed in the channel 92. The first end 86 of the piston 54 can define the channel 92 such that the distal end 78 of the piston 54 can be exposed outside of the piston 54. It is to be appreciated that the plunger 76 can extend outside of the piston 54 in any suitable location.

The piston device 52 can further include an actuator 94 (see FIGS. 4 and 5) disposed in the chamber 90 and engaging the plunger 76 when the piston 54 moves to the second position. It is to be appreciated that the actuator 94 can be disposed in both the chamber 90 and the channel 92 or any other suitable location.

Generally, in certain embodiments, the actuator 94 is further defined as a phase-changing composition changeable between a first phase and a second phase to allow the piston 54 to move between the first and second positions. When the phase-changing composition is in the first phase, the fluid is at the first temperature and the piston 54 is in the first position.

When the phase-changing composition is in the second phase, the fluid is at the second temperature and the piston 54 is in the second position. Generally, the phase-changing composition expands when changing from the first phase to the second phase. For example, as the fluid becomes warm or hot, the phase-changing composition changes from the first phase to the second phase. It is to be appreciated that the actuator 94 can be a biasing device or any other suitable actuator to allow the piston 54 to move between the first and second positions.

In certain embodiments, the first phase occurs when the phase-changing composition is generally in a solid form and the second phase occurs when the phase-changing composition is generally in a liquid form. In other words, as the fluid enters the cavity 68, the fluid moves across an exterior 96 of the piston 54 which warms the piston 54, and as the piston 54 warms, the phase-changing composition changes from the solid form to the liquid form which causes the phase-changing composition to expand. The expanding phase-changing composition applies a force to the plunger 76 and the piston 54 which overcomes the force being applied to the piston 54 by the second biasing member 74, which causes the piston 54 to move from the first position to the second position. Generally, the fluid moves across the exterior 96 of the piston 54 adjacent to the chamber 90 of the piston 54.

In certain embodiments, the phase-changing composition includes a wax material. It is to be appreciated that the phase-changing composition can be partially in the liquid form when in the first phase and the phase-changing composition can be partially in the solid form when in the second phase. It is to be appreciated that the phase-changing composition can include any suitable phase-changing materials that can expand.

In addition, the phase-changing composition can be changeable to an intermediate phase between the first and second phases. Furthermore, the fluid can be at an intermediate temperature between the first and second temperatures. As such, the piston 54 can be movable to an intermediate position between the first and second positions. Therefore, when the fluid is at the intermediate temperature, the phase-changing composition is at the intermediate phase and thus the piston 54 moves to the intermediate position. The intermediate phase generally occurs when the phase-changing composition is partially in the solid form and partially in the liquid form. In other words, the intermediate phase occurs when the phase-changing composition has partially expanded such that the piston 54 moves between the first and second positions. The intermediate position of the piston 54 is discussed further below.

In certain embodiments, the intermediate temperature of the fluid is from about 82° C. to about 92° C. In other embodiments, the intermediate temperature of the fluid is from about 82° C. to about 86° C. In one embodiment, the intermediate temperature of the fluid is about 82° C. It is to be appreciated that the intermediate temperature of the fluid can be any suitable temperature. Specifically, depending on the actuator 94 or the composition of the phase-changing composition, the ranges for the first, second and intermediate temperatures can be changed. For example, changing the density of the phase-changing composition will correspondingly change the first, second and intermediate temperatures. Therefore, as discussed above, the first, second and intermediate temperatures can be any suitable temperatures to move the piston 54 as desired.

Continuing with FIGS. 4 and 5, the cavity 68 of the housing 22 can include a first portion 98 and a second portion 100 in fluid communication with each other and adjacent to each other such that the housing 22 presents a shoulder 102 between the first and second portions 98, 100. Generally, the outlet 48 and the first portion 98 are in fluid communication with each other. In other words, the outlet 48 intersects the first portion 98 of the cavity 68. Furthermore, the second port 26 is in fluid communication with the first portion 98 of the cavity 68. In other words, the second port 26 intersects the first portion 98 of the cavity 68. In addition, the inlet 46 and the second portion 100 are in fluid communication with each other. In other words, the inlet 46 intersects the second portion 100 of the cavity 68. In certain embodiments, the piston 54 is disposed in the first portion 98 and engages the shoulder 102 when in the second position for directing the fluid from the second port 26, through the cavity 68, and out the outlet 48 away from the transmission casing 12.

As discussed above, the piston 54 can include the first end 86 and the second end 88 spaced from each other along the longitudinal axis 70. The first biasing member 72 is disposed in the first portion 98 and the distal end 78 of the plunger 76 extends outwardly from the first end 86 of the piston 54 such that the first biasing member 72 and the first end 86 of the piston 54 are spaced from each other. More specifically, the seat 80 is disposed in the first portion 98 between the first biasing member 72 and the piston 54; therefore, the first biasing member 72 engages the rear side 84 of the seat 80 while the distal end 78 of the plunger 76 engages the front side 82 of the seat 80 such that the seat 80 is spaced from the first end 86 of the piston 54. Generally, the second biasing member 74 is disposed in the second portion 100 and engages the second end 88 of the piston 54.

The valve assembly 18 can further include a valve body 104 mounted in the cavity 68. Therefore, the cavity 68 can be disposed through the outer periphery 50 for inserting the valve body 104 into the cavity 68, as well as the first and second biasing members 72, 74, the piston 54, the seat 80, and/or any other components of the valve assembly 18. It is to be appreciated that at least a portion of the valve assembly 18 can be inserted into the cavity 68 as a unit.

Generally, the valve body 104 cooperates with the piston 54 to route the fluid through the inlet 46 and/or the outlet 48. In other words, when the piston 54 is in the first position, the piston 54 engages the valve body 104 such that the fluid is routed back into the inlet 46, through the first port 24 and directly back into the transmission casing 12 (see FIG. 4 and the first flow path 53 of the fluid); therefore, the fluid bypasses the outlet 48 such that the fluid is not routed through the container 20 before re-entering the transmission casing 12. When the piston 54 is in the second position, the piston 54 is spaced from the valve body 104 and engages the shoulder 102 such that the fluid is routed through the outlet 48 (see FIG. 5 and the second flow path 55 of the fluid) into the container 20 before re-entering the transmission casing 12. In other words, when the piston 54 is in the second position, the second end 88 of the piston 54 engages the shoulder 102 which prevents the fluid from entering the inlet 46 from the second portion 100 of the cavity 68; therefore, the fluid is routed through the first portion 98 of the cavity 68 out the outlet 48 and into the container 20 before being re-directed back to the valve assembly 18 and the transmission casing 12. When the fluid re-enters the valve assembly 18 from the container 20, the fluid enters the inlet 46 and is routed through the first port 24 back into the transmission casing 12.

Continuing with FIGS. 4 and 5, the valve body 104 can include a rim 106, with the piston 54 engaging the rim 106 when in the first position for directing the fluid from the second port 26, through the cavity 68, into the inlet 46, through the first port 24 and back into the transmission casing 12 with the outlet 48 being bypassed (see FIG. 4 and the first flow path 53 of the fluid). The piston 54 is spaced from the rim 106 when in the second position for directing the fluid from the second port 26, through the cavity 68, out the outlet 48 and away from the transmission casing 12 (see FIG. 5 and the second flow path 55 of the fluid).

More specifically, the rim 106 defines an opening 108 with the first end 86 of the piston 54 disposed through the opening 108. Therefore, when the piston 54 is in the first position, the piston 54 engages the rim 106 such that the fluid cannot move through the opening 108 and out the outlet 48. Furthermore, when the piston 54 is in the second position, the piston 54 is spaced from the rim 106 such that the fluid can move through the opening 108 and out the outlet 48 (see FIG. 5 and the second flow path 55 of the fluid).

Continuing with FIGS. 4 and 5, the piston 54 can include a lip 110 engaging the rim 106 when in the first position and the lip 110 is spaced from the rim 106 when in the second position. Generally, the lip 110 is disposed between the first and second ends 86, 88 of the piston 54. Therefore, when the piston 54 is in the first position, the lip 110 of the piston 54 engages the rim 106 such that the fluid cannot move through the opening 108 and out the outlet 48. Furthermore, when the piston 54 is in the second position, the lip 110 of the piston 54 is spaced from the rim 106 such that the fluid can move through the opening 108 and out the outlet 48.

Figure 6:
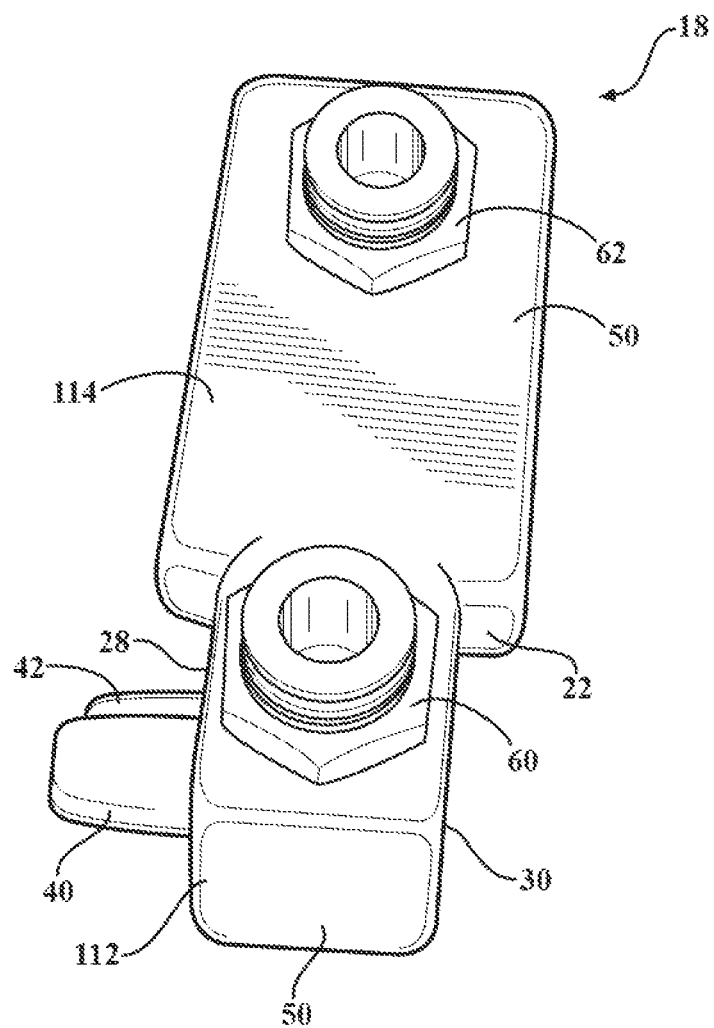
FIG. 6 is a schematic perspective view of the valve assembly including a housing of a second configuration.

In addition to the above, the configuration of the housing 22 of the valve assembly 18 of FIG. 3 can change. As shown in FIGS. 3 and 6, the housing 22 can include a first segment 112 and a second segment 114 adjacent to each other, with the first and second protrusions 40, 42 extending from the first segment 112. The first segment 112 of the housing 22 in FIG. 3 is wider than the second segment 114. As shown in FIG. 6, the first segment 112 has been modified such that the first segment 112 of the housing 22 is narrower than the second segment 114 of the housing 22. The different configuration of the housing 22 of FIG. 6 provides additional space to reach other components of the vehicle during assembly.

Figure 7:
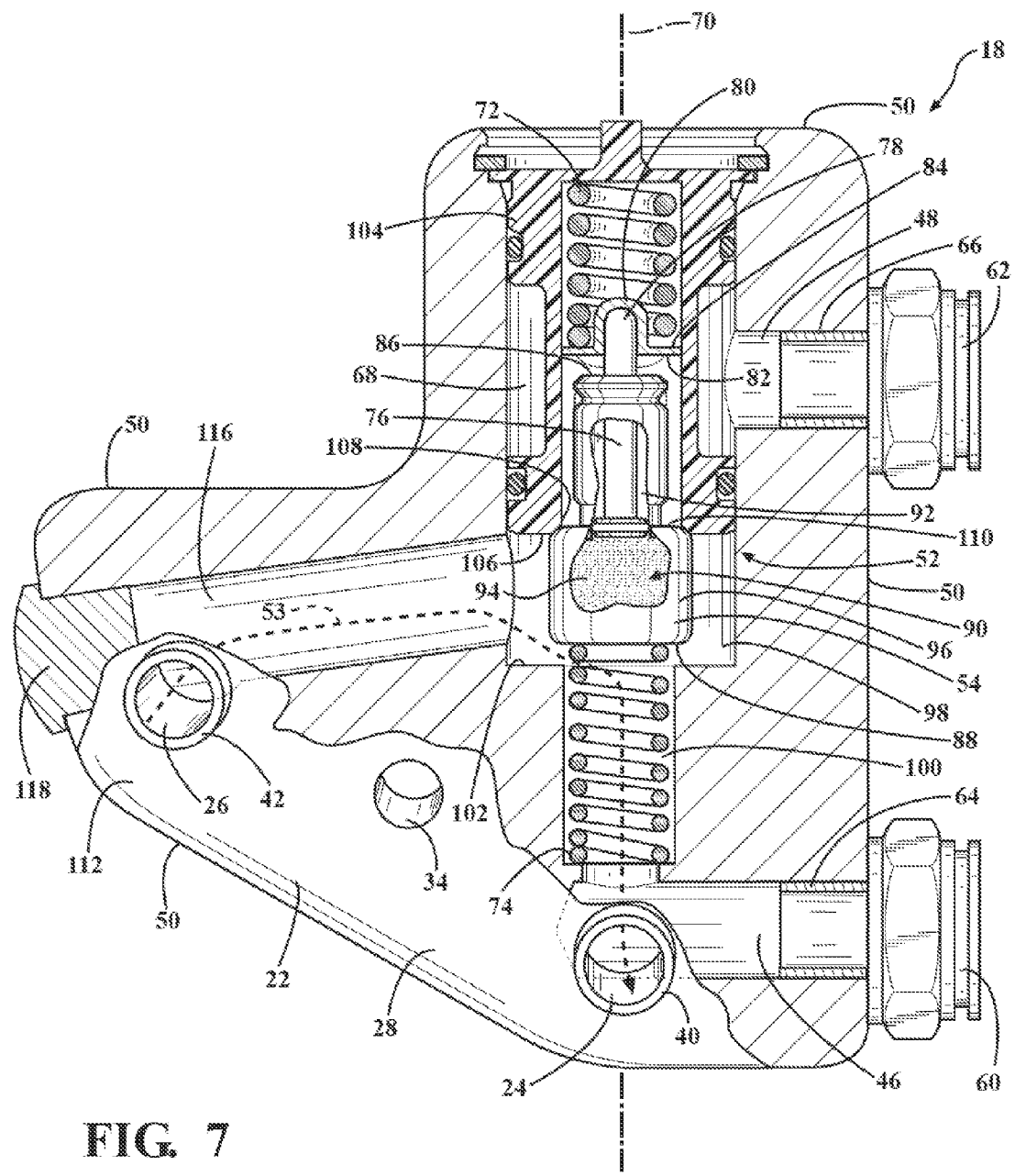
FIG. 7 is a schematic partial cross-sectional view of the valve assembly of FIG. 6.

The valve assembly 18 of FIGS. 6 and 7 function the same as discussed above for FIGS. 1-5 and therefore the specific details will not be re-discussed for this embodiment. FIG. 7 illustrates the piston 54 in the first position such that the fluid moves along the first flow path 53. When comparing FIGS. 4 and 5 with FIG. 7, the length and orientation of the inlet 46 and the outlet 48 have changed. For example, the length of the inlet 46 and the outlet 48 of FIG. 7 are shorter than the length of the inlet 46 and the outlet 48 of FIGS. 4 and 5. Furthermore, when comparing FIGS. 4 and 5 with FIG. 7, the second port 26 has changed. Specifically, in FIG. 7, the second port 26 does not directly intersect the cavity 68 and therefore, the housing defines a passage 116 interconnecting the second port 26 and the cavity 68. As such, the second port 26, the passage 116 and the cavity 68 are in fluid communication with each other. In the embodiment of FIGS. 6 and 7, when the fluid exits the transmission casing 12, the fluid is routed through the second port 26, through the passage 116 and into the cavity 68. More specifically, from the transmission casing 12, the fluid is routed through the second port 26, through the passage 116 and into the first portion 98 of the cavity 68. When the fluid reaches the cavity 68, the fluid is routed the same as discussed above for the embodiment of FIGS. 1-5. A plug 118 can be disposed in the passage 116 to close or seal the end of the passage 116 intersecting the outer periphery 50.

For illustrative purposes only, the operation of the bypass system 10 is discussed below. The operation will begin with the vehicle being off such that the fluid inside the transmission casing 12 is stationary and at the first temperature. Furthermore, the operation will begin with the piston 54 being in the first position, as shown in FIG. 4, and the phase-changing composition being in the first phase.

When the vehicle is started, the fluid begins to move into and out of the transmission casing 12. Assuming that the fluid is at the first temperature when the vehicle is initially started, the piston 54 remains in the first position (see FIG. 4), therefore, the lip 110 of the piston 54 engages the rim 106 of the valve body 104 such that the fluid is routed, in sequence, out the second aperture 16 of the transmission casing 12, through the second port 26 of the housing 22, through the first portion 98 of the cavity 68 of the housing 22, through the second portion 100 of the cavity 68 of the housing 22, through the inlet 46 of the housing 22, through the first port 24 of the housing 22, through the first aperture 14 of the transmission casing 12 and back inside the transmission casing 12 (also see the first flow path 53 of the fluid as illustrated in FIG. 4). Back pressure minimizes the fluid from moving out of the inlet 46 and into the first tube 56 when the piston 54 is in the first position. The outlet 48 is bypassed when the piston 54 is in the first position such that the fluid cannot be routed to the container 20. Simply stated, when the fluid is at the first temperature, the fluid is cycled back into the transmission casing 12 while bypassing the container 20. Therefore, the fluid moving out of the transmission casing 12 is directly routed into the valve assembly 18 and then directly back into the transmission casing 12.

As the vehicle continues to run, the temperature of the fluid inside the transmission casing 12 begins to increase. Therefore, the fluid exiting the transmission casing 12 is becoming warm which, in turn, warms the piston 54. Warming the piston 54, in turn, warms the phase-changing composition inside the piston 54. Assuming that the fluid reaches the intermediate temperature at this point, the phase-changing composition is in the intermediate phase which causes the composition to expand and the piston 54 to move from the first position to the intermediate position between the first and second positions. When the piston 54 is in the intermediate position, the lip 110 of the piston 54 is spaced from the rim 106 of the valve body 104 and the second end 88 of the piston 54 is spaced from the shoulder 102 of the housing 22. Therefore, some of the fluid moves through the inlet 46 into the first port 24 and back into the transmission casing 12 to bypass the container 20 and some of the fluid moves through the outlet 48 and into the container 20 before re-entering the transmission casing 12. In other words, fluid moves simultaneously through the inlet 46 and the outlet 48 when the piston 54 is in the intermediate position. Therefore, some of the fluid is cooled down to the first temperature in the container 20 before being routed through the first tube 56, through the inlet 46 and through the first port 24 back into the transmission casing 12.

As the vehicle continues to yet run, the temperature of the fluid inside the transmission casing 12 continues to increase. Therefore, the fluid exiting the transmission casing 12 may be hot which in turn continues to warm the piston 54. Continuing to warm the piston 54, in turn, continues to warm the phase-changing composition inside the piston 54. Assuming that the fluid reaches the second temperature at this point, the phase-changing composition is in the second phase which causes the composition to expand more which causes the piston 54 to move from the intermediate position to the second position. When the piston 54 is in the second position, as shown in FIG. 5, the lip 110 of the piston 54 is spaced from the rim 106 of the valve body 104 and the second end 88 of the piston 54 engages the shoulder 102 of the housing 22. With the piston 54 engaging the shoulder 102, the fluid cannot enter the second portion 100 of the cavity 68, and therefore, the fluid cannot enter the inlet 46 and loop directly back into the transmission casing 12. Instead, when the piston 54 is in the second position, the fluid is routed, in sequence, out the second aperture 16 of the transmission casing 12, through the second port 26 of the housing 22, through the first portion 98 of the cavity 68 of the housing 22, through the opening 108 of the rim 106 of the valve body 104, through the outlet 48 of the housing 22, through the second tube 58 and into the container 20 to decrease the temperature of the fluid (also see the second flow path 55 of the fluid as illustrated in FIG. 5). When the fluid exits the container 20, the fluid is at the first temperature, and then the first temperature fluid is routed, in sequence from the container 20, through the first tube 56, through the inlet 46, through the first port 24, into the first aperture 14 of the transmission casing 12 and back inside the transmission casing 12 to lubricate and/or cool various components inside the transmission casing 12.

Mounting the valve assembly 18 to the transmission casing 12 minimizes the travel distance of the fluid between the transmission casing 12 and the valve assembly 18 which thus improves various vehicle efficiencies. Furthermore, mounting the valve assembly 18 to the transmission casing 12 minimizes spin losses of various components inside the transmission casing 12. In addition, mounting the valve assembly 18 to the transmission casing 12 improves fuel economy and vehicle energy economy. More specifically, having the valve assembly 18 mounted directly to the transmission casing 12 allows the fluid at the first temperature to be directly routed back into the transmission casing 12 when the piston 54 is in the first position such that the fluid re-interacts with the various components inside the transmission casing 12 within a short amount of time which increases the temperature of the fluid quicker. Increasing the temperature of the fluid in the shorter amount of time improves vehicle efficiencies, such as minimizing spin losses, improving fuel economy, etc.

While the best modes for carrying out the disclosure have been described in detail, those familiar with the art to which this disclosure relates will recognize various alternative designs and embodiments for practicing the disclosure within the scope of the appended claims.

The invention claimed is:

1. A bypass system for a transmission, the system comprising:
   a transmission casing defining a first aperture and a second aperture spaced from the first aperture;
   a valve assembly including:
      a housing defining a first port and a second port spaced from each other;
      wherein the housing defines an inlet in fluid communication with the first port and an outlet selectively in fluid communication with the second port;
      an actuation device disposed in the housing and including a member movable between a first position for routing a fluid from the second port into the inlet, through the first port and directly back into the transmission casing with the outlet being bypassed and a second position for routing the fluid from the second port into the outlet and away from the transmission casing;
      wherein the housing is mounted to the transmission casing such that the first port and the first aperture cooperate with each other for routing the fluid into the transmission casing directly from the valve assembly, and the second port and the second aperture cooperate with each other for routing the fluid out of the transmission casing directly into the valve assembly;
      wherein the housing of the valve assembly defines a cavity along a longitudinal axis, with the member moveable within the cavity, and with the second port, the inlet and the outlet in fluid communication with the cavity; and wherein the valve assembly includes a first biasing member and a second biasing member each disposed in the cavity to assist the actuation device, with the member disposed between the first and second biasing members;

wherein the actuation device is further defined as a piston device and the member is further defined as a piston;

wherein the valve assembly includes a valve body mounted in the cavity, with the valve body including a rim, and with the piston engaging the rim when in the first position for directing the fluid from the second port, through the cavity, into the inlet, through the first port and back into the transmission casing with the outlet being bypassed, and with the piston spaced from the rim when in the second position for directing the fluid from the second port, through the cavity, out the outlet and away from the transmission casing.

2. A system as set forth in claim 1 wherein the transmission casing includes a mounting portion defining the first and second apertures, with the housing engaging the mounting portion.

3. A system as set forth in claim 2 wherein the housing includes a first protrusion and a second protrusion each extending outwardly from the housing, with the first protrusion further defining the first port and the second protrusion further defining the second port, and wherein the first protrusion is disposed in the first aperture of the mounting portion and the second protrusion is disposed in the second aperture of the mounting portion.

4. A system as set forth in claim 2 wherein the mounting portion defines a bore and the housing of the valve assembly defines a hole spaced from the actuation device, with the hole and the bore aligning with each other, and further including a fastener disposed in the hole and the bore to mount the valve assembly to the transmission casing.

5. A system as set forth in claim 2 further including a container for receiving the fluid when the member is in the second position, and further including a first tube and a second tube each attached to the valve assembly and the container for guiding the fluid directly between the valve assembly and the container.

6. A system as set forth in claim 1 wherein the housing of the valve assembly includes a first side facing the transmission casing and a second side opposing the first side, and wherein the housing includes a first protrusion and a second protrusion each extending outwardly from the first side of the housing, with the first protrusion further defining the first port and the second protrusion further defining the second port.

7. A system as set forth in claim 6 wherein the transmission casing defines a bore and the housing of the valve assembly defines a hole through the first and second sides, with the hole and the bore aligning with each other, and further including a fastener disposed in the hole and the bore to mount the valve assembly to the transmission casing.

8. A system as set forth in claim 7 wherein the housing of the valve assembly includes an outer periphery between the first and second sides, with the inlet and the outlet extending through the outer periphery.

9. A system as set forth in claim 1 wherein the second biasing member engages the piston to continuously bias the piston to the first position and wherein the piston device includes a plunger disposed inside the piston and extending to a distal end exposed outside of the piston, with the first biasing member coupled to the distal end of the plunger to continuously bias the plunger toward the second biasing member.

10. A system as set forth in claim 9 wherein the piston defines a chamber and a channel adjacent to the chamber and in fluid communication with each other, with the plunger disposed in the channel, and wherein the piston device includes an actuator disposed in the chamber and engaging the plunger when the piston moves to the second position.

11. A system as set forth in claim 10 wherein the actuator is further defined as a phase-changing composition changeable between a first phase and a second phase to allow the piston to move between the first and second positions.

12. A system as set forth in claim 9 wherein the valve assembly includes a seat having a front side and a rear side opposing the front side, with the distal end of the plunger engaging the front side of the seat and the first biasing member engaging the rear side of the seat.

13. A system as set forth in claim 9 wherein the cavity of the housing includes a first portion and a second portion in fluid communication with each other and adjacent to each other such that the housing presents a shoulder between the first and second portions, and wherein the outlet and the first portion are in fluid communication with each other, and wherein the inlet and the second portion are in fluid communication with each other, with the piston disposed in the first portion and engaging the shoulder when in the second position for directing the fluid from the second port, through the cavity, and out the outlet away from the transmission casing.

14. A system as set forth in claim 13 wherein the piston includes a first end and a second end spaced from each other along the longitudinal axis, with the first biasing member disposed in the first portion and the distal end of the plunger extends outwardly from the first end of the piston such that the first biasing member and the first end of the piston are spaced from each other, and with the second biasing member disposed in the second portion and engaging the second end of the piston.

15. A system as set forth in claim 1 wherein the piston includes a lip engaging the rim when in the first position and the lip spaced from the rim when in the second position.

16. A bypass system for a transmission, the system comprising:

a transmission casing including a mounting portion defining a first aperture and a second aperture spaced from each other;

a valve assembly including:
a housing includes a first side facing the transmission casing, with the housing defining a first port and a second port spaced from each other and each disposed through the first side;
wherein the housing defines an inlet in fluid communication with the first port and an outlet selectively in fluid communication with the second port;
wherein the housing defines a cavity along a longitudinal axis, with the second port, the inlet and the outlet disposed transverse to the longitudinal axis and in fluid communication with the cavity;
a piston device disposed in the cavity of the housing and including a piston movable between a first position for routing a fluid from the second port into the inlet and back into the transmission casing with the outlet being bypassed and a second position for routing the fluid from the second port into the outlet and away from the transmission casing; and
wherein the housing is mounted to the mounting portion of the transmission casing such that the first port and the first aperture cooperate with each other for routing the fluid into the transmission casing directly from the valve assembly, and the second port and the second aperture cooperate with each other for routing the fluid out of the transmission casing directly into the valve assembly;

wherein the cavity of the housing includes a first portion and a second portion in fluid communication with each other and disposed adjacent to each other such that the housing presents a shoulder between the first and second portions, and wherein the piston is disposed in the first portion and engages the shoulder when in the second position for directing the fluid from the second port, through the cavity, and through the outlet away from the transmission casing, and the piston is spaced from the shoulder when in the first position.

17. A system as set forth in claim 16 further including a container for receiving the fluid when the piston is in the second position, and further including a first tube and a second tube each attached to the valve assembly and the container for guiding the fluid directly between the valve assembly and the container.

18. A bypass system for a transmission, the system comprising:
- a transmission casing defining a first aperture and a second aperture spaced from the first aperture;
- a valve assembly including:
  - a housing defining a first port and a second port spaced from each other;
  - wherein the housing defines an inlet in fluid communication with the first port and an outlet selectively in fluid communication with the second port;
  - an actuation device disposed in the housing and including a member movable between a first position for routing a fluid from the second port into the inlet and back into the transmission casing with the outlet being bypassed and a second position for routing the fluid from the second port into the outlet and away from the transmission casing;
- wherein the housing is mounted to the transmission casing such that the first port and the first aperture cooperate with each other for routing the fluid into the transmission casing directly from the valve assembly, and the second port and the second aperture cooperate with each other for routing the fluid out of the transmission casing directly into the valve assembly;
- wherein the housing of the valve assembly defines a cavity along a longitudinal axis, with the member moveable within the cavity, and with the second port, the inlet and the outlet in fluid communication with the cavity; and
- wherein the valve assembly includes a first biasing member and a second biasing member each disposed in the cavity to assist the actuation device, with the member disposed between the first and second biasing members;
- wherein the actuation device is further defined as a piston device and the member is further defined as a piston;
- wherein the second biasing member engages the piston to continuously bias the piston to the first position and wherein the piston device includes a plunger disposed inside the piston and extending to a distal end exposed outside of the piston, with the first biasing member coupled to the distal end of the plunger to continuously bias the plunger toward the second biasing member;
- wherein the piston defines a chamber and a channel adjacent to the chamber and in fluid communication with each other, with the plunger disposed in the channel, and wherein the piston device includes an actuator disposed in the chamber and engaging the plunger when the piston moves to the second position.

19. A system as set forth in claim 18 wherein the valve assembly includes a seat having a front side and a rear side opposing the front side, with the distal end of the plunger engaging the front side of the seat and the first biasing member engaging the rear side of the seat.

20. A system as set forth in claim 18 wherein the cavity of the housing includes a first portion and a second portion in fluid communication with each other and adjacent to each other such that the housing presents a shoulder between the first and second portions, and wherein the outlet and the first portion are in fluid communication with each other, and wherein the inlet and the second portion are in fluid communication with each other, with the piston disposed in the first portion and engaging the shoulder when in the second position for directing the fluid from the second port, through the cavity, and out the outlet away from the transmission casing.

* * * * *